United States Patent [19]

Bogan, Jr.

[11] Patent Number: 4,939,229

[45] Date of Patent: Jul. 3, 1990

[54] METHOD FOR PREPARING LITHOGRAPHICALLY SENSITIVE BRANCHED NOVOLAKS USING A MANNICH BASE INTERMEDIATE

[75] Inventor: Leonard E. Bogan, Jr., Harleysville, Pa.

[73] Assignee: Rohm and Haas Company, Philadelphia, Pa.

[21] Appl. No.: 351,154

[22] Filed: May 12, 1989

[51] Int. Cl.$^5$ .................... C08G 8/16; C08G 16/02
[52] U.S. Cl. .................... 528/144; 528/149; 528/210; 522/166; 522/146; 430/270
[58] Field of Search .................... 528/144, 149, 210

[56] References Cited

U.S. PATENT DOCUMENTS

| | | | |
|---|---|---|---|
| 2,147,789 | 2/1939 | Graves | 528/149 |
| 2,431,011 | 11/1947 | Zimmer et al. | 528/210 |
| 2,636,019 | 4/1953 | Butler | 528/149 |
| 4,468,507 | 8/1984 | Parker | 528/150 |
| 4,474,929 | 10/1984 | Schrader | 528/98 |

FOREIGN PATENT DOCUMENTS

| | | | |
|---|---|---|---|
| 0102960 | 6/1982 | Japan | 528/149 |
| 0101108 | 6/1983 | Japan | 528/149 |
| 1154297 | 5/1985 | U.S.S.R. | |

OTHER PUBLICATIONS

H. A. Bruson and C. W. MacMullen, J. Am-Chem. Soc., vol. 63, p. 270 (1941).

*Primary Examiner*—Morton Foelak
*Assistant Examiner*—Frederick Krass

[57] ABSTRACT

A method for preparing branched novolak polymers possessing excellent lithographic performance is provided. The method involves the acid catalyzed reaction of a phenol with a tris- or tetrakis(dialkylaminoalkyl)-phenol followed by purification of the reaction product. The branched novolaks are soluble in aqueous base and organic solvent solutions and are particularly useful as the polymeric component of either positive acting or negative acting photoresist compositions.

6 Claims, No Drawings

METHOD FOR PREPARING LITHOGRAPHICALLY SENSITIVE BRANCHED NOVOLAKS USING A MANNICH BASE INTERMEDIATE

FIELD OF THE INVENTION

This invention relates to a method for preparing novolak polymers which possess excellent lithographic performance. More particularly, the invention is directed to a synthesis process useful for preparing branched novolak polymers of reproducible molecular weight and dissolution rate properties.

BACKGROUND OF THE INVENTION

Novolak (or novolac) resins are commonly used as the polymeric component of lithographic compositions, such as photoresist compositions used in the manufacture of semiconductors. Novolak polymers prepared by conventional synthesis methods are mixtures of polymers formed by the acid catalyzed condensation reaction of a molar excess of a phenol, having at least two of its ortho and para positions relative to the hydroxyl group unsubstituted, with formaldehyde. The reaction proceeds in two steps. The rate limiting (slow) step involves the addition of formaldehyde to the unsubstituted ortho and para positions on the phenol ring. No ring substitution occurs at the meta position. In the much faster step, the methylol groups, resulting from formaldehyde addition to the phenol ring during the rate limiting step, are joined with the excess phenol at its unsubstituted ortho and para positions by methylene bridges therebetween forming the novolak polymer. The sequence of reactions may be represented by the following equation (1); the novolak shown being only one of the many possible configurations actually formed in the complex mixture of structures and stereoisomers.

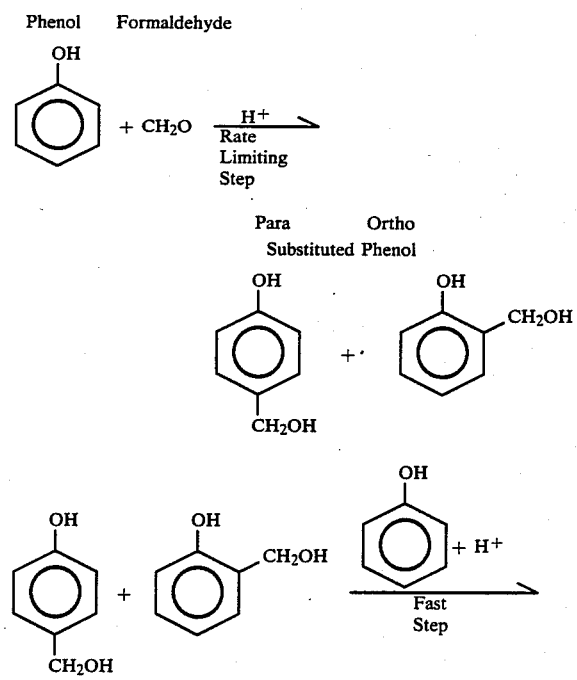

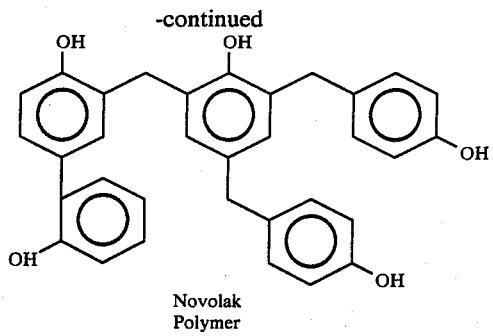

*Phenolic Resins*, A. Knop and L. A. Pilato, Chapter 3, Springer-Verlag, NY (1985) provides a more detailed discussion of novolak resins.

The novolak polymers, like other condensation polymers, have a broad molecular weight distribution. This distribution becomes broader as the desired molecular weight of novolak polymers increases. The molecular weight of novolak polymers prepared by conventional synthesis techniques is controlled by the ratio of formaldehyde to phenol. The conventional broad molecular weight distribution is a direct consequence of the single step growth nature of the above synthesis in which each methylol substituted phenol reacts with a stoichiometric amount of the excess phenol. In an open system, the ability to reproducibly prepare novolak polymers having the same molecular weight becomes increasingly difficult as the molecular weight of the polymer is increased. The molecular weight distribution is difficult to reproduce because the high volatility of formaldehyde decreases the effective ratio of formaldehyde to phenol present for the rate limiting step of the reaction. In addition, for all practical purposes, the stereochemistry of such a single step growth polymer is random, and therefore, it is very difficult to utilize the conventional synthesis process to reproducibly manufacture high molecular weight novolak polymers of a consistent molecular weight and composition.

A very important criterion for selecting a polymer for use in lithographic applications is the dissolution rate of the polymer in the developer solution. The developer, typically an organic solvent or an aqueous base solution, is used to selectively remove portions of a polymeric coating after certain portions of the coating have been exposed to actinic radiation. In a positive acting photoresist composition the developer is used to selectively remove those portions of the photoresist film which have been exposed to the actinic radiation. In a negative acting photoresist composition the developer selectively removes those portions of the photoresist film which have not been exposed. The lithographic performance of a photoresist is a function of the photoresist dissolution rate expressed in terms of sensitivity and contrast. Sensitivity refers to the dose of exposing radiation needed to achieve a specified dissolution rate difference between the exposed and unexposed polymer. Lithographic potential is measured as the logarithm of the fraction of the unexposed dissolution rate of the photoresist divided by the dissolution rate of the exposed photoresist film. Alternatively, sensitivity may be expressed in terms of the lithographic potential of the photoresist at a constant exposure dosage. Contrast refers to the slope of a plot of the lithographic potential (vertical axis) as a function of the exposure dose (horizontal axis); the higher the sensitivity and contrast the better the lithographic performance of a polymer.

I evaluated the lithographic performance of a number of novolak polymers prepared by conventional synthesis techniques and hypothesized that the lithographic performance could be improved if the extent of branching of the novolak were to be increased. Further, I also noted that the absorbance by novolaks of deep ultraviolet radiation in the wavelength range of from about 235 to 300 nanometers appeared to decrease as the concentration of p-cresol used as one of the phenols in the novolak synthesis increased, however, conventional p-cresol-containing novolaks formed from greater than about 40 weight percent p-cresol were not sufficiently soluble in aqueous base solutions for use in photoresists.

DESCRIPTION OF THE PRIOR ART

There are a number of references which disclose methods for preparing branched novolak polymers. The general technique is to separate the two steps involved in the conventional novolak synthesis. In the first step, the phenol is reacted with a large excess, for example, 3 to 4 molar equivalents, of formaldehyde in a basic medium, such as for example, by using a metal hydroxide as conventionally used to prepare resole resins, to form tris(hydroxymethyl)phenol. The tris(hydroxymethyl)phenol may then be reacted with additional phenol in an acidic medium to form the novolak. Since each phenol ring of the tris(hydroxy methyl)phenol contains three methylol groups, the subsequent growth of the polymer during the second reaction will occur three rings at a time instead of one at a time as in conventional synthesis thus producing a more highly branched novolak polymer. In addition, since the first step of this alternative synthesis causes the methylol groups from the molar excess of formaldehyde to become attached to each phenol ring, the formaldehyde is no longer a volatile reactant, and the stoichiometry of reaction will not change during polymerization thus providing some control over the molecular weight distribution of the polymer. The randomness of the stereochemistry of addition is also controlled since it is ensured that at least some phenol rings must have three methylene bridge connections to the other phenol rings in the polymer.

Despite these apparent advantages, two disadvantages remain. First, it is difficult to make pure tris(hydroxymethyl)phenol by this route without also producing a significant quantity of dimers and higher oligomers. Secondly, and even more problematical is the thermal instability of tris(hydroxy methyl)phenol itself. Tris(hydroxymethyl)phenol will condense with itself even at room temperature. This problem could possibly be mitigated by blocking the reactive methylol groups as by reacting the tris(hydroxymethyl)-phenol with an alcohol, such as methanol, in an acidic environment to form a material which is thermally stable in the absence of acid, such as for example, tris(methyoxymethyl)phenol. H.A. Bruson and C.W. MacMullen, J. Am. Chem. Soc., Vol 63, p. 270 (1941) disclose the use of a secondary amine base instead of a metal hydroxide to form tris(dialkylaminomethyl)phenol. If the amine is dimethylamine and the phenol ordinary phenol, the product is tris(dimethylaminomethyl)phenol.

Additional references which disclose methods of preparing branched novolaks for purposes other than for use in lithographic applications include U.S. Pat. Nos. 4,256,844; 4,468,507; 4,474,929; 4,468,507; and USSR Pat. No. 1154297. USSR Pat. No. 1154297 is directed to polymeric powders useful for hermetic sealing of electronic components. The powder contains epoxy bisphenol A resins and a hardener salt based on tris(dimethylaminomethyl)-phenol. The hardener salt is prepared by reacting a phenol, namely, dihydroxyphenylpropane, with tris(dimethylaminomethyl)-phenol in the presence of sebacic acid catalyst to form a branched novolak resin.

U.S. Pat. No. 4,256,844 is directed to the preparation of fire retardant, thermosetting resinous reaction products of phosphoric acid and methylol- or alkoxy-methyl-substituted epoxides. The patent discloses the use of branched novolaks formed by the reaction of a phenol with a methylol compound in the presence of hydrochloric acid. The methylol compound may be an alkoxymethyl- phenol or hydroxymethylphenol. The branched novolak so formed is then epoxidized, as by reaction with epichlorohydrin, and the resulting glycidyl ether is then reacted with phosphoric acid to form the thermosetting fire retardant resin.

U.S. Pat. No. 4,468,507 is directed to a method for preparing branched novolaks. This method relates to the control of the heat of evolution of the reaction during large scale production. A methylol-reactive phenol is reacted with polymethyloldiphenol in the presence of an acid catalyst on a scale which permits temperature control by heat removal. Following this, additional premixed reactants and catalyst are added at a rate which permits the reaction mixture to be readily controlled. The methylol-reactive phenols may be monoor dihydric phenols having at least one hydrogen capable of condensing with a methylol group. Suitable polymethylolphenols include bis- or diphenols which are ring substituted with at least 3, and preferably 4, methylol groups. A typical novolak produced by the method is derived from tetramethylol- bisphenol A and ordinary phenol. The objective is to form a branched novolak which will provide a closely knit structure when epoxidized and cured. Suitable acids employed as catalysts in the process include oxalic acid, hydrochloric acid, p-toluenesulfonic acid and acid form ion exchange resins. A similar method for preparing branched novolaks is disclosed in U.S. Pat. No. 4,474,929.

U.S. Pat. No. 3,504,040 is directed to trisubstituted resorcinol compounds, as for example, tris(alkoxymethyl)resorcinol, which are disclosed for use as curing agents and reinforcements for rubber compositions. These compounds are prepared by the reaction of resorcinol with paraformaldehyde and methanol in isopropanol and is illustrative of the use of a more stable (methanol-capped) derivative of a polymethylolphenol.

It is an object of the present invention to provide a synthesis process suitable for preparing highly branched novolak resins useful for lithographic applications.

It is an additional object of the invention to provide a process for preparing thermally stable, highly branched novolak polymers where the extent of branching is independent of molecular weight and where the novolak can reproducibly exhibit a high degree of lithographic performance.

It is a further object of the invention to provide highly branched novolaks containing a high proportion of p-cresol which are soluble in aqueous base and organic solvents.

SUMMARY OF THE INVENTION

A method is provided for the reproducible preparation of high purity, branched novolaks possessing excellent lithographic performance. The method involves the reaction of a phenol with tris(dialkylaminoalkyl)phenols or tetrakis(dialkylaminoalkyl)phenols in the presence of an acid catalyst which sublimes at a temperature below the decomposition temperature of the novolak polymer, and purifying the resulting branched novolak polymer to remove undesirable reactants, byproducts and catalyst.

DETAILED DESCRIPTION OF THE INVENTION

I have found a method for preparing thermally stable, highly branched, high purity novolak polymers suitable for use in lithographic applications. The method involves the use of tris(dialkylaminoalkyl)phenol or tetrakis(dialkylaminoalkyl)phenol and an acid catalyst which sublimes at a temperature below the decomposition temperature of the branched novolak polymer produced by the process.

I selected tris(dialkylaminoalkyl)phenols and tetrakis(dialkylaminoalkyl)phenols a one of the starting reactants because of their ability for controlling both the stereochemistry of addition and molecular weight distribution of the final novolak polymer. In addition, both tris(dialkylaminoalkyl)phenols and tetrakis(dialkylaminoalkyl)phenols are thermally stable and do not self condense to any significant degree at ordinary temperatures.

Tris(dialkylaminoalkyl)phenols and tetrakis(dialkylaminoalkyl)phenols or bisphenols may be prepared by the reaction of at least three (tris)or four (tetrakis) molar equivalents of any dialkylamine, at least three(tris) or four(tetrakis) molar equivalents of an (alkyl)aldehyde and one molar equivalent of a phenol having unsubstituted ortho- and para-ring positions. Examples of suitable phenols include meta-cresol, bisphenol A, bisphenol F and 3,5 dimethylphenol and other di(hydroxyphenol)alkanes. I have found that tris- (dimethyl-aminomethyl)-phenol, manufactured by Rohm and Haas under the trademark DMP-30, prepared by reacting phenol, dimethylamine and formaldehyde is particularly useful as it is readily prepared at high purity and is thermally stable at 200° C.

The tris or tetrakis(dialkylaminoalkyl)phenol is then reacted with at least one molar equivalent of a phenol, having at least one unsubstituted ortho- or para-ring position, in the presence of a suitable acidic catalyst to form the branched novolak. The phenols which may be used in this step of the process include o-cresol, m-cresol, p-cresol, 2-sec-butylphenol, 2,6-dimethyl- phenol, 3,4-dimethylphenol, 3,5-dimethylphenol, 2,3,5-trimethylphenol, 2,3,6-trimethylphenol , resorcinol, 2-methylresorcinol and resorcinol derivatives. These phenols may be used alone or in admixture.

The novolak polymer so prepared is preferably purified to remove essentially all traces of reactants such as unreacted phenol and dimethylamine as well as the acid catalyst. I have found that if the branched novolak prepared according to the invention is stable at a temperature equal to or above the temperature at which the reactants and catalyst vaporize or sublime, it is possible by simple distillation to remove the reactants below the detection limits of nuclear magnetic resonance spectroscopy. For example, oxalic acid useful as a catalyst for the condensation polymerization reaction, sublimes at about 140° C. and decomposes at about 180° C. forming carbon dioxide and water. The branched novolaks prepared by the process of the invention are thermally stable to temperatures in excess of 200° C. Accordingly, I have been able to purify the branched novolaks by distilling the reaction products at 230° C. under vacuum (less than about 10 mm mercury) to reduce residual phenol to less than 0.5 percent and dimethylamine and oxalic acid to less than 0.1 percent. This finding is in contrast to novolak synthesis utilizing sebacic acid, as disclosed in USSR 1154297, which does not thermally decompose for purification or remove by distillation.

When the phenol used for reaction with the tris- or tetrakis(dialkyl- aminoalkyl)phenol is para-cresol, we have unexpectedly found that branched novolaks containing about 75 parts p-cresol units are soluble in both aqueous base and organic solvents. This finding is surprising since p-cresol novolaks prepared by conventional novolak synthesis are not fully soluble in either aqueous base or organic solvents when the p-cresol content exceeds about 40 percent.

The process of the present invention produces branched novolaks which are soluble in aqueous base and organic solvents. A commercially important finding is that not only is the dissolution rate of the novolaks high but also that the dissolution rate is reproducible from batch to batch. This is important since it offers lithographers the ability to reduce or eliminate one or more of the costly quality control and blending operations currently employed to ensure reproducible lithographic performance.

The following examples are presented to illustrate the synthesis of branched novolaks, purification thereof, and their lithographic performance and are presented only to illustrate the invention and should not be construed to limit the scope of the invention as other modifications will be obvious to those of ordinary skill in the art.

EXAMPLE 1:

Preparation of 74 p-cresol/26 phenol novolak copolymer. In a 1L, 4-neck round-bottom flask, were mixed 432.12 g (4.0 mol) p-cresol, 41.6 g (0.33 mol) oxalic acid dihydrate, and 100 g diglyme. The mixture was warmed to 40° C. under $N_2$ with stirring, and then a solution of 52.92 g (0.20 mol) Rohm and Haas DMP-30 in 25 g diglyme was added. After the exotherm peaked at 59°, the mixture was heated to 100° and held with stirring for 190 min. Volatiles were distilled under a $N_2$ sweep until the pot temperature reached 240°, then under vacuum (15 mm Hg) at 240° for 30 min. The product was cooled to solidify.

Analysis by 13CNMR spectroscopy showed that the composition was 74 p-cresol/26 phenol. These materials are useful as the polymeric component of positive or negative-tone photoresist.

EXAMPLE 2

A negative-tone photoresist was prepared by dissolving 16 g of a novolak resin prepared from condensation of DMP-30 with m-cresol, 0.99 g of Gyro-X (a photo-acid generator), and 2.82 g of American Cyanamid Cymel 1170 in 64 g of butyl cellosolve acetate. This photoresist was spin coated onto a 3 inch silicon wafer and exposed to a pattern of broad band deep-UV radiation. The dissolution rate of the unexposed regions of the resist was 2630Å/sec in 0.27 N $(CH_3)_4N$(aq) and the dissolution rate of the regions exposed to 2.5 mJ/cm$^2$ of radiation was 13Å/sec in the same developer.

I claim:

1. A method for preparing thermally stable, highly branched novolak polymers consisting essentially of reacting a tris(dialkylaminoalkyl)phenol or tetrakis(dialkylaminoalkyl) phenol with at least one molar equivalent of a phenol having at least one unsubstituted ortho- or para-ring position in the presence of an acid catalyst to form a highly branched novolak polymer, said acid catalyst being selected from the group of acids which sublime or distil, or decompose below the decomposition temperature of the highly branched novolak.

2. The method of claim 1 wherein the highly branched novolak polymer is purified by heating the reaction product to a temperature above the decomposition or sublimiation, or distillation temperature of the acid catalyst and below the d composition temperature of the highly branched novolak polymer.

3. The method of claim 2 wherein said highly branched novolak polymer is separated from the acid catalyst by distillation.

4. The method of claim 1 wherein the acid catalyst is oxalic acid and salts thereof.

5. The method of claim 1 wherein the highly branched novolak polymer contains at least about 40% by weight p-cresol.

6. The method of claim 1 wherein said phenol containing at least one unsubstituted ortho- or para-ring position is selected from the group consisting of o-cresol, m-cresol, p-cresol, 2-sec-butylphenol, 2,6-dimethylphenol, 3,4dimethylphenol, 3,5-dimethylphenol, 2,3,5-trimethylphenol, 2,3,6-trimethyl-phenol,resorcinol, 2-methylresorcinol, and mixtures thereof.

* * * * *